United States Patent [19]
Gadowski

[11] Patent Number: 6,152,469
[45] Date of Patent: Nov. 28, 2000

[54] VEHICLE QUARTER FENDER

[75] Inventor: Boguslaw R. Gadowski, Portland, Oreg.

[73] Assignee: Freightliner Corporation, Portland, Oreg.

[21] Appl. No.: 09/200,275

[22] Filed: Nov. 24, 1998

[51] Int. Cl.⁷ ................................................... B62D 25/16
[52] U.S. Cl. ........................................... 280/154; 280/851
[58] Field of Search .................................... 280/848, 851, 280/154, 159; D12/185

[56] References Cited

U.S. PATENT DOCUMENTS

| | | |
|---|---|---|
| Re. 24,339 | 7/1957 | La Pere . |
| D. 205,137 | 6/1966 | Weasel, Jr. . |
| D. 303,237 | 9/1989 | Hawes et al. . |
| D. 303,238 | 9/1989 | Antekeier . |
| D. 366,640 | 1/1996 | Tucker et al. . |
| 794,472 | 1/1905 | Thompson . |
| 2,557,147 | 6/1951 | Schatzman . |
| 2,914,341 | 11/1959 | Martt . |
| 2,972,149 | 2/1961 | Bracesco . |
| 3,337,238 | 8/1967 | Weasel, Jr. . |
| 3,497,237 | 2/1970 | Vis . |
| 3,506,282 | 4/1970 | Miyanaga . |
| 3,867,049 | 2/1975 | Rice, Jr. . |
| 3,922,003 | 11/1975 | Lea . |
| 4,148,373 | 4/1979 | Cline . |
| 4,268,053 | 5/1981 | Toppins et al. . |
| 4,377,294 | 3/1983 | Lockwood et al. . |
| 4,406,474 | 9/1983 | Scharf . |
| 4,591,178 | 5/1986 | Mortvedt et al. . |
| 4,706,980 | 11/1987 | Hawes et al. . |
| 4,735,428 | 4/1988 | Antekeier . |
| 4,740,003 | 4/1988 | Antekeier . |

*Primary Examiner*—Richard M. Camby
*Attorney, Agent, or Firm*—Klarquist Sparkman Campbell Leigh & Whinston LLP

[57] ABSTRACT

A quarter fender may be of a uniform homogenous material with a body having a fender portion, a deflector flap portion, and a mounting portion. The deflector flap portion may include a removable section of a reduced average thickness which may be severed from a neck of the deflector portion and replaced with a replacement deflector section. The neck may include recesses extending partially therethrough, which may be fully penetrated to accommodate fasteners coupling the replacement section to the neck. The upper surface of the fender body may be projection free.

20 Claims, 6 Drawing Sheets

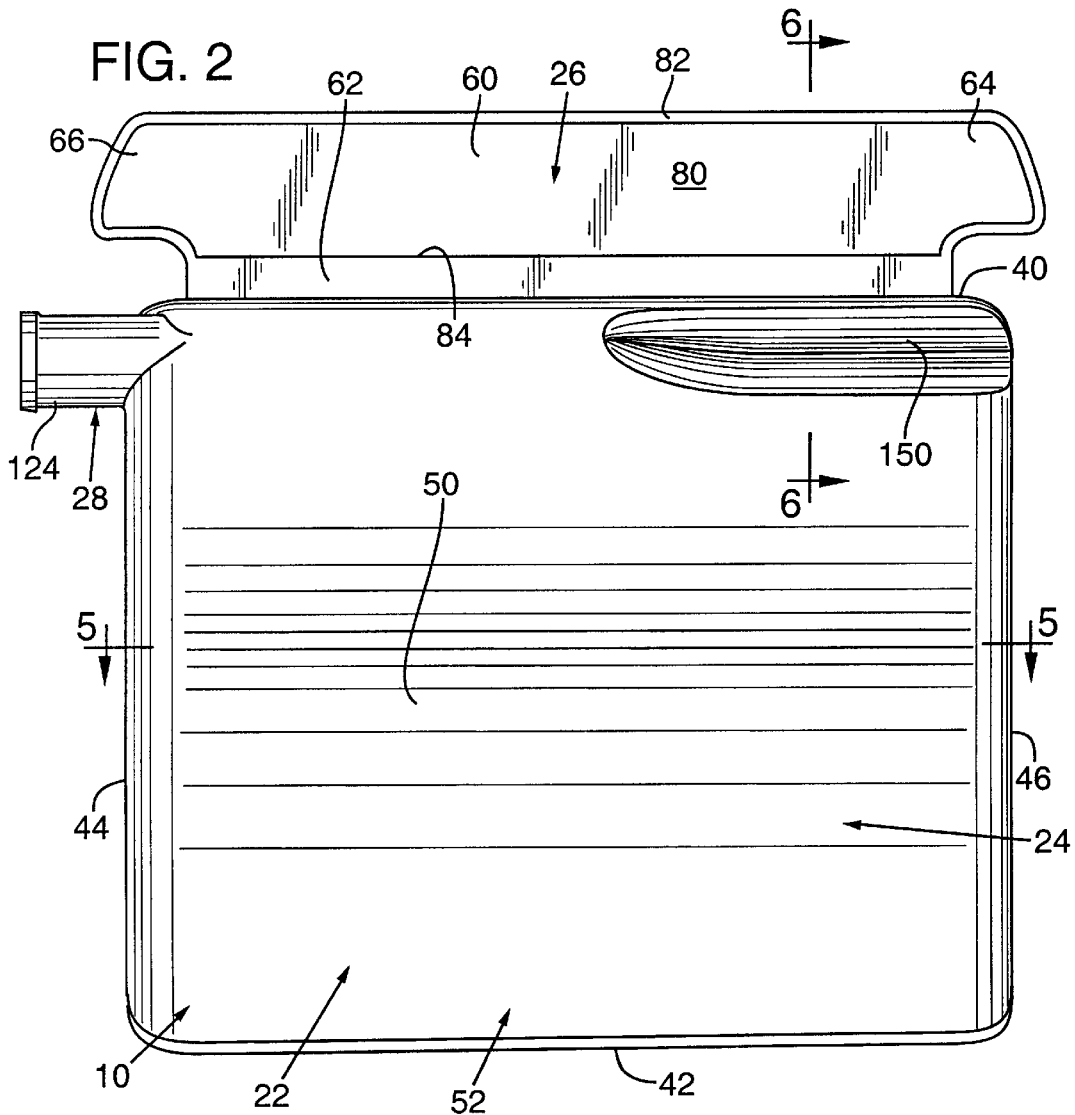

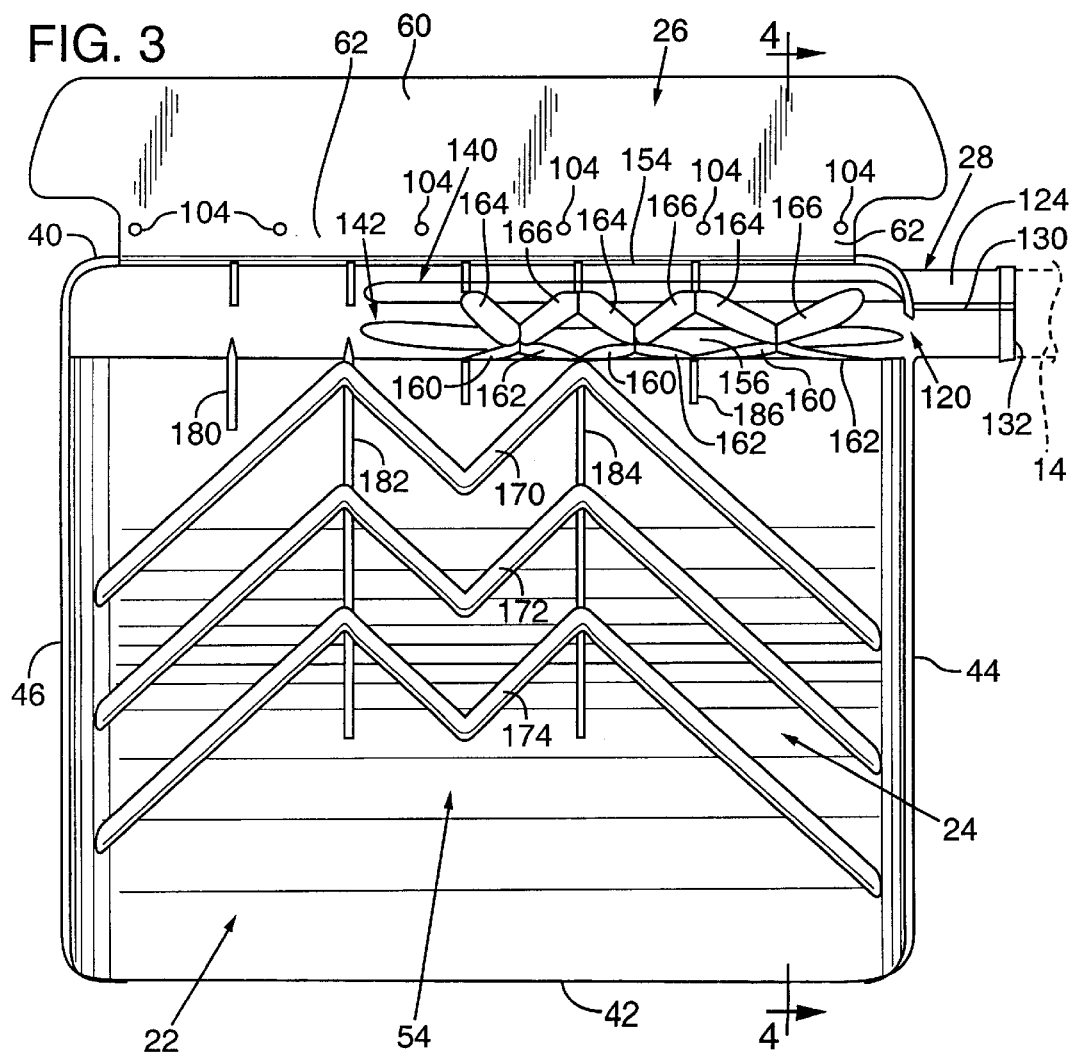

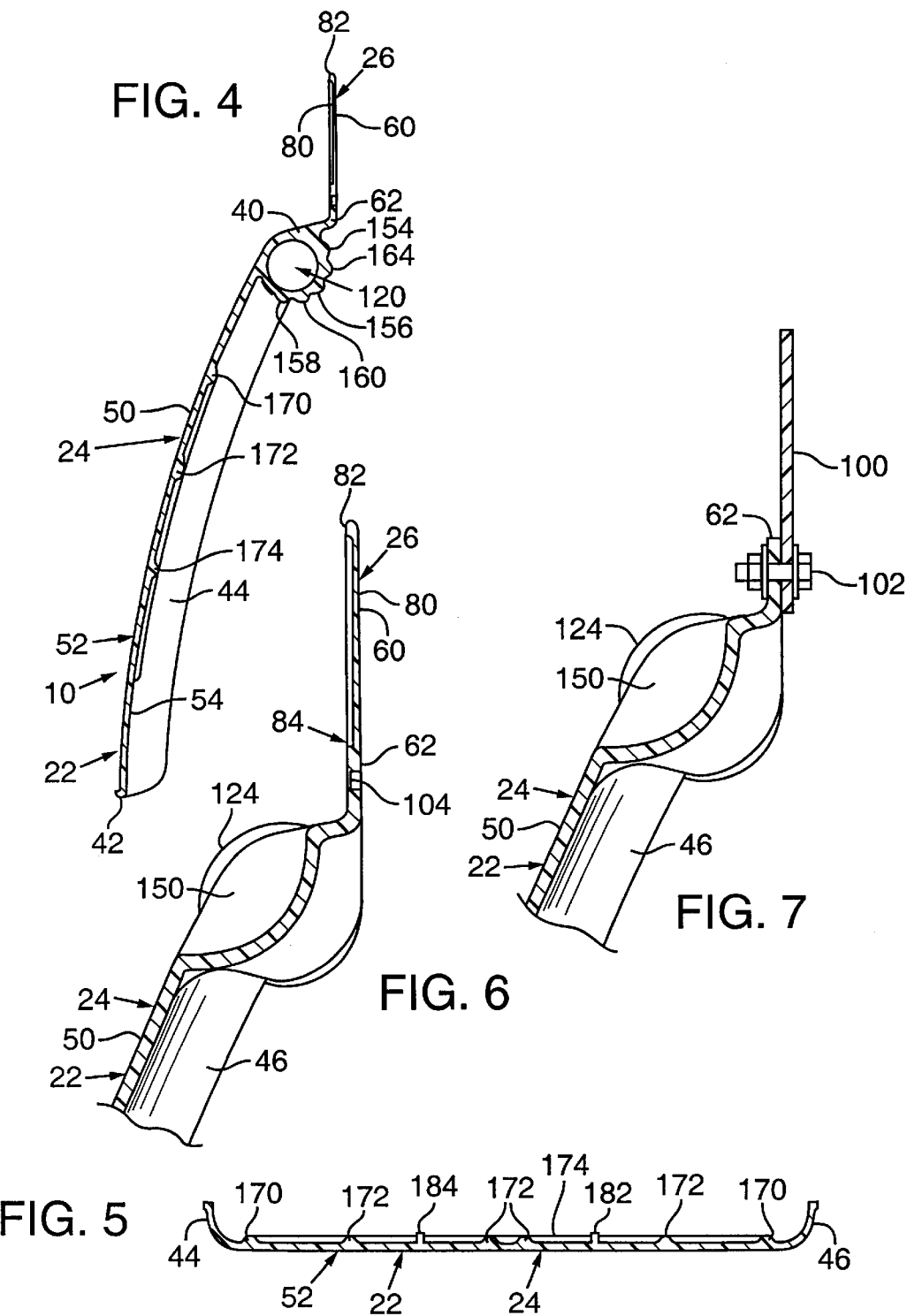

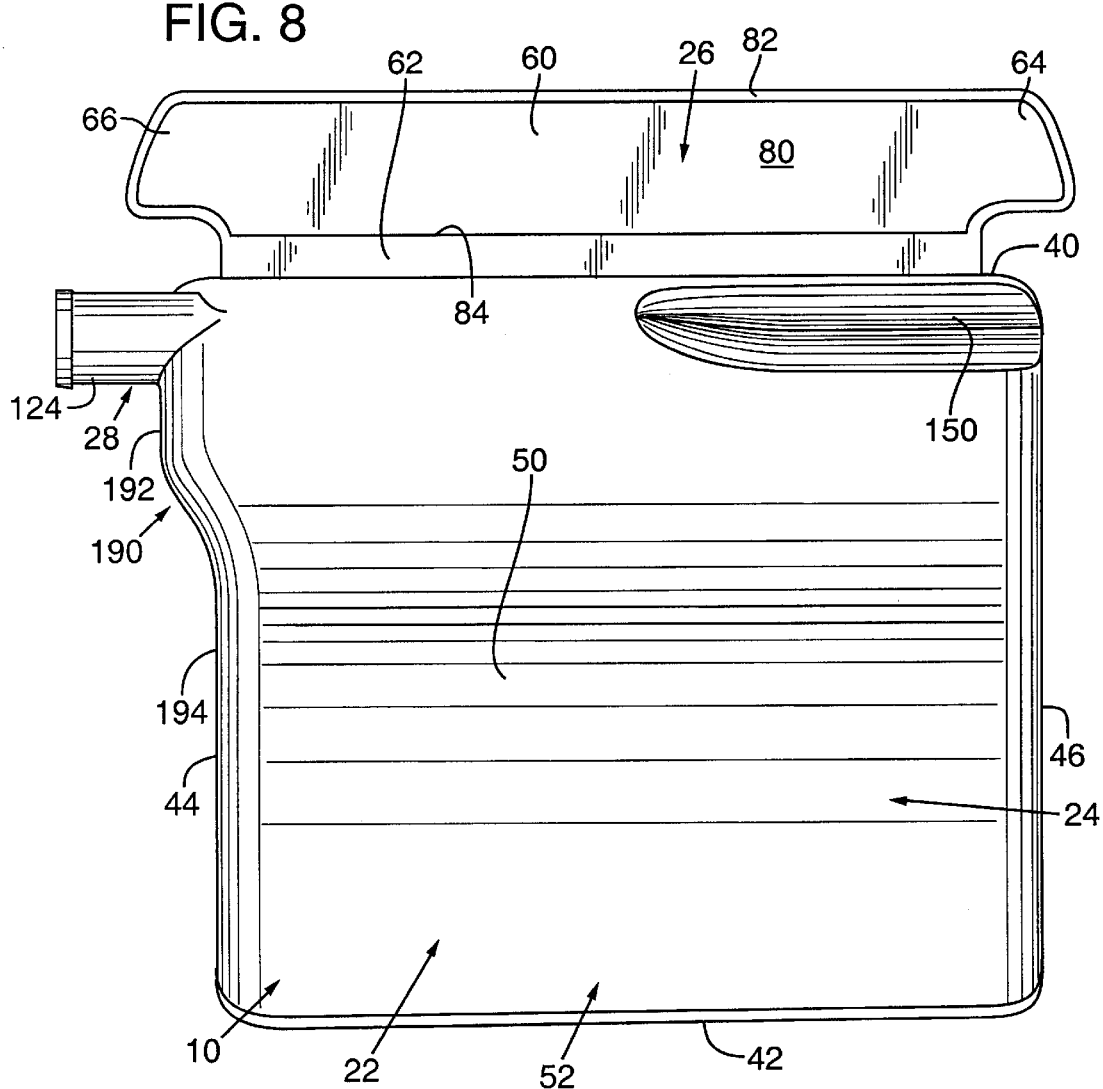

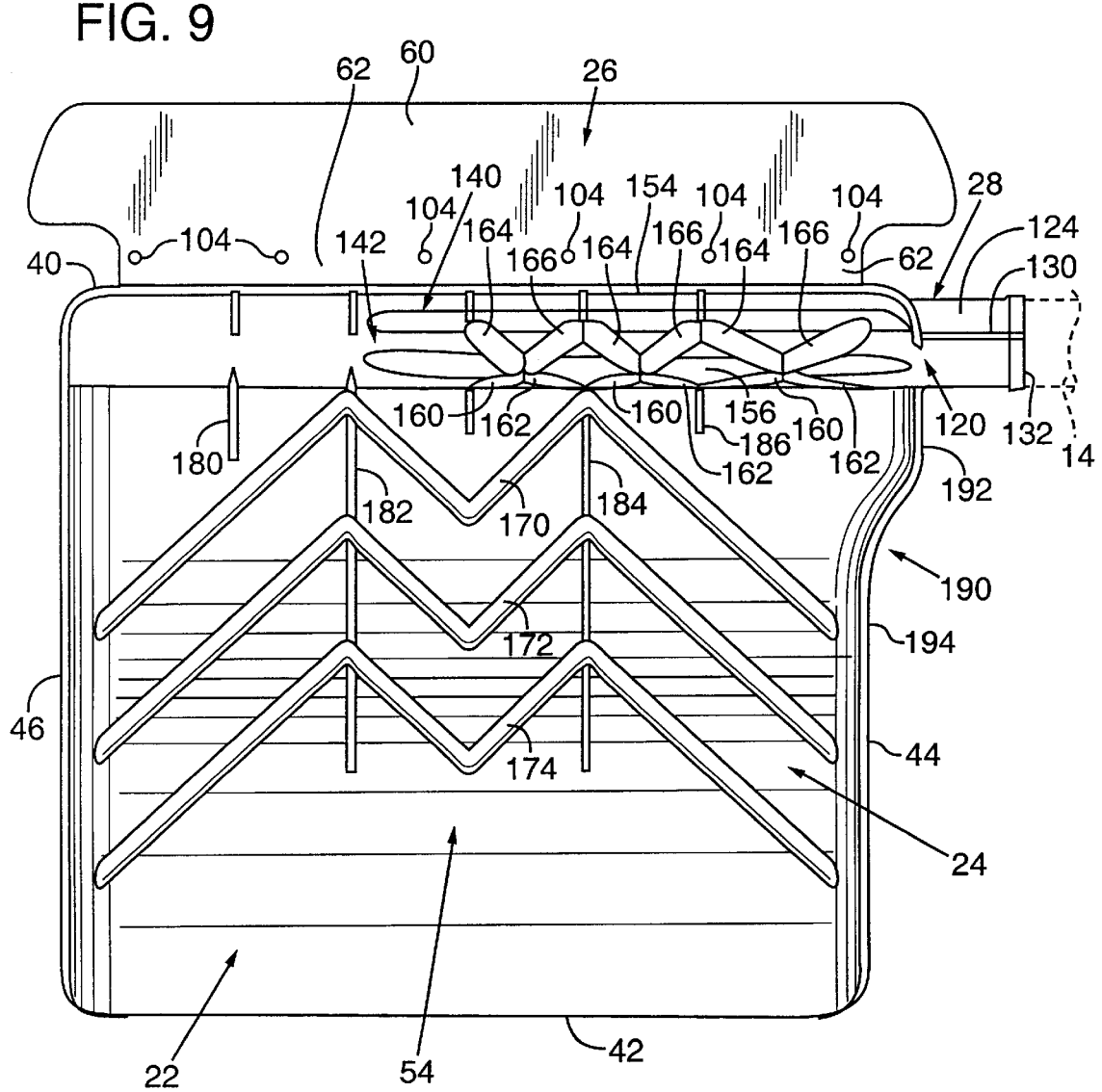

VEHICLE QUARTER FENDER

BACKGROUND

The present invention relates to quarter fenders for vehicles such as trucks.

Quarter fenders for vehicles typically mount to the chassis or frame rails of the vehicle in a position to deflect spray and other debris that is picked up from a road surface by rotating tires. Typically, quarter fenders are positioned forwardly of a rotating wheel. In this case, the term "forward" refers to a location in front of the wheel, that is, closer to the front of the vehicle traveling in a forward direction. Quarter fenders have been manufactured by a number of companies for mounting to vehicles.

It is not unusual for these quarter fenders to comprise an arcuately shaped metal or plastic panel with side edge flanges, an upper edge, and a lower edge. It is also not uncommon for a deflector plate to be mounted by bolts or other fasteners to the upper edge of the quarter fender. With this approach, initial installation of a deflector plate requires the installation of numerous fasteners. In addition, detachment of the deflector plate, for example for replacement when damaged, requires the removal of these fasteners during replacement. Since deflector plates may be damaged, for example from rocks and other flying debris, the use of a detachable deflector plate does allow replacement of the deflector plate in the event it becomes damaged, without the necessity of replacing the entire quarter fender.

For reinforcing purposes, it is also known to incorporate a rigidifying bracket or plate into an injected molded one-piece fender during the molding process to provide a quarter fender assembly. U.S. Pat. No. 4,740,003 is illustrative of this approach. However, this involves the provision of a separate reinforcing bracket for imbedding in the fender assembly during manufacture.

Many known quarter fender constructions, such as exemplified by U.S. Pat. No. 4,148,373, include a tube-like receptacle for receiving a projecting mount from the frame rail or chassis of a vehicle. The mounting tube in this particular example is positioned on the top surface of the fender assembly where it detracts from the aesthetic appearance of the assembly and also where it interferes with a smooth continuous outer surface of the quarter fender.

Therefore, a need exists for an improved quarter fender assembly for a vehicle directed toward overcoming disadvantages of existing quarter fender assemblies individually, collectively, or both.

SUMMARY

The present invention relates to a quarter fender assembly having one or more novel and unobvious differences from existing quarter fender assemblies as set forth in the claims, below. The invention is directed toward quarter fenders having novel and unobvious features and advantages, described more fully below, alone and/or in combination with other features and advantages.

In accordance with one aspect, an illustrated quarter fender is comprised of a one-piece body having a fender portion, a deflector flap portion, and a mounting portion. Most preferably, the quarter fender, and more particularly the body, is of a homogenous uniform material such as of a polymer material. Consequently, reinforcing inserts can be omitted from this construction. The fender portion has an upper edge portion, a lower edge portion, first and second outer side portions, and a central fender portion with a top surface and an under or bottom surface. A deflector flap portion extends generally upwardly, when the quarter fender is mounted to a vehicle, from the upper edge portion of the fender portion. The mounting portion is adapted to mount to a quarter fender mount on the vehicle. In one form, the mounting portion comprises a receptacle which receives a projection from the frame rail of a vehicle and which is clamped to the projection to mount the quarter fender in place.

In an illustrated form of quarter fender, the deflector flap portion has a removable section which is adapted for detachment. For example, in the case of a polymer quarter fender, the removable section may be cut or otherwise severed from the remaining portions of the quarter fender when it is removed. Upon detachment of the removable section, a replacement flap portion may be attached to remaining portions of the quarter fender, for example, by fasteners. With this specific approach, no fasteners are required to secure the initial deflector flap portion to remaining portions of the quarter fender, thereby saving assembly time. Yet, replacement of the deflector flap portion is facilitated in the event the original deflector flap portion is damaged.

More specifically, the deflector flap portion may include a first section having a first average thickness positioned adjacent to the upper edge portion of the fender portion. In this case, the removable section may be coupled to the upper edge portion of the fender portion by the first section of the deflector flap portion. In addition, the removable section may have a severing region of a second thickness which, on average, is less than the first average thickness and which typically extends transversely across substantially the entire width of the deflector flap portion. This facilitates removal of the removable section by making the removable section easier to sever from other portions of the deflector flap portion of the assembly, which remain in place. In addition, by providing a removable section with a severing region of reduced thickness, the severing region optionally extending throughout virtually the entire removable section, reducing the thickness of the entire removable section, flexing of the removable section of the deflector flap portion is facilitated in the event it is engaged by portions of a trailer or otherwise during use. If the deflector flap portion is of a polymer or other resilient material, following this engagement, the removable section will tend to return to its original upright deflecting position.

As a further specific aspect of the illustrated form of quarter fender, the first section of the deflector flap portion which remains following severing of the removable section may include spaced apart recesses or partial penetrations. These recesses may be penetrated to provide respective openings through which fasteners may be inserted to detachably secure a replacement second section to the first section of the deflector flap portion.

The mounting portion of the quarter fender may comprise a transversely extending mounting projection receiving receptacle positioned to project outwardly from the under surface of the fender portion of the body and away from the top surface of the fender portion. In this case, the top surface of the fender portion lacks upwardly extending projections and thus may comprise a substantially continuous smooth surface between the upper and lower edge portions. That is, in this specific example, the mounting receptacle does not project upwardly above the upper surface of the central portion of the fender body. The mounting portion may also be positioned adjacent to the upper edge portion of the fender portion.

In one specific illustrated form of quarter fender, the mounting receptacle extends from the first outer side portion toward the second outer side portion of the fender body and also includes a central portion which narrows from a position below the mounting portion and toward the lower edge portion.

The mounting receptacle may extend more than one-half the distance across the fender body from the first outer side portion toward the second outer side portion. In addition, the center portion of the quarter fender may include a recess extending into the top surface of the fender body and extending at least partially across the fender body from about the end of the mounting receptacle toward the second outer side portion.

Reinforcing ribs may be provided for both the mounting projection receiving receptacle and the central portion of the fender body. These ribs typically project outwardly from the under surface of the structure so that they are not exposed to the outer surface of the quarter fender. As a specific example, the reinforcing ribs projecting from the central portion of the body may comprise a plurality of spaced apart M-shaped ribs positioned above one another and substantially spanning the distance between the first and second outer side edge portions.

BRIEF DESCRIPTION OF THE DRAWINGS

FIG. 2 is a front elevation view of the quarter fender of FIG. 1.

FIG. 3 is a rear elevation view of the quarter fender of FIG. 1.

FIG. 4 is a vertical sectional view of the quarter fender of FIG. 3, taken along line 4—4 thereof.

FIG. 5 is a transverse cross-sectional view of the quarter fender of FIG. 1, taken along line 5—5 of FIG. 2.

FIG. 6 is a partial vertical sectional view of the quarter fender of FIG. 1, taken along line 6—6 of FIG. 2.

FIG. 7 is a partial sectional view similar to that of FIG. 6, except showing a replacement deflector flap section mounted in place.

FIG. 8 is a front elevation view of an alternative embodiment of a quarter fender in accordance with the present invention.

FIG. 9 is a rear elevation view of the quarter fender of FIG. 8.

DETAILED DESCRIPTION OF ILLUSTRATED EMBODIMENTS

Figure 1:
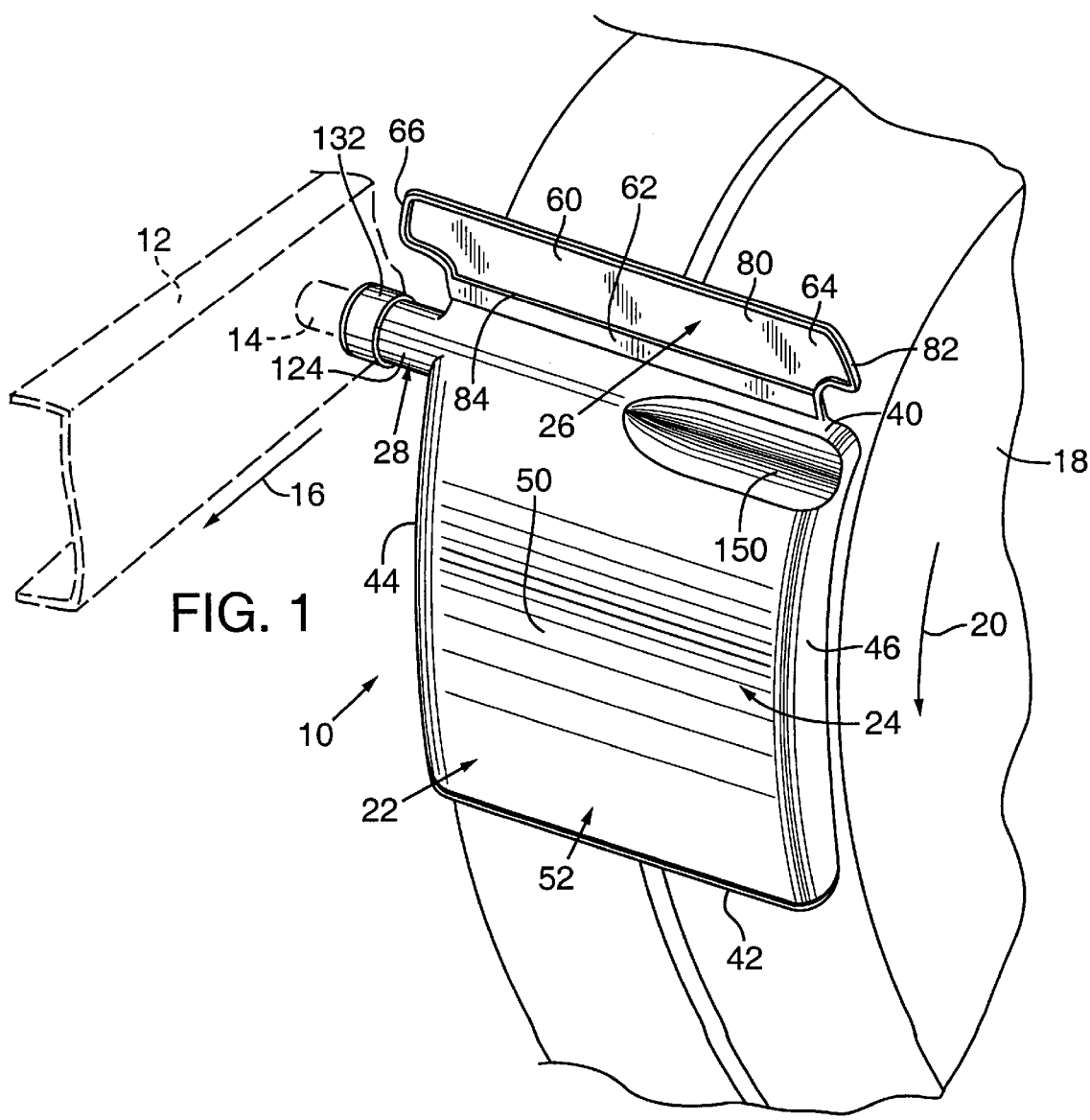
FIG. 1 is a perspective view of one form of a quarter fender in accordance with the present invention shown mounted to a frame rail of a vehicle at a location forwardly of a vehicle wheel.

FIG. 1 illustrates a quarter fender 10 shown mounted to the chassis of a vehicle and, more specifically, to one frame rail 12 of the vehicle. The frame rail includes a quarter fender mount, in this case a projecting pin 14 which extends outwardly from the frame rail in a direction perpendicular to the longitudinal axis of the frame rail. Arrow 16 in FIG. 1 points toward the front of the vehicle. A wheel in indicated at 18 and rotates in the direction indicated by arrow 20 when the truck is moving in a forward direction. Consequently, the quarter fender 10 deflects spray and debris picked up by wheel 18 from a road surface as the vehicle travels.

With reference to FIGS. 1, 2, and 3, the illustrated quarter fender 10 has a body 22 with a fender portion 24, a deflector portion 26, which extends generally upwardly from the fender portion when the quarter fender is installed on the vehicle, and a mounting portion 28.

The illustrated fender portion 24 has an upper edge portion 40, a lower edge portion 42, a first outer side portion 44, a second outer side portion 46, and a central main fender portion 50. The main fender 50 includes an outer surface 52, and an under surface 54 (FIG. 3).

In general, the central fender portion 50, as well as the side edge portions 44, 46, are arcuate and shaped to generally follow the curvature of the wheel 18 when the quarter fender 10 is mounted in place. The side edge portions 44, 46 may be curved rearwardly as shown to extend away from the front surface 52. As a result, the under surface 54 of quarter fender 10 together with the outer side edge portions 44 and 46 in effect form a channel for directing spray from the wheel 18 downwardly and toward the sides of the wheel.

Although alternative constructions are possible, in the illustrated FIG. 1 form, the fender portion, deflector flap portion, and mounting portion are of one-piece construction without any inserts. As a specific example, these components may be of a uniform, homogenous material, such as a polymer material with high density polyethylene being a specific example. One suitable polyethylene material is Escorene HD-6706 from Exxon Chemical Company.

In the illustrated construction, the deflector flap portion 26 has a removable section 60 which is adapted for detachment from remaining portions of the assembly in the event it becomes worn or damaged. When detached, a replacement flap portion may be mounted to the remaining portions of the quarter fender, thereby repairing the quarter fender without the need of replacing the entire quarter fender 10.

In the specific construction shown, the deflector flap portion 26 includes a first or neck section 62 extending transversely across the upper edge portion 40 of the quarter fender body 22. Neck 62 may be narrower than the overall width of the fender body. Thus, as can be seen in FIGS. 1–3, the illustrated neck 62 terminates inwardly from the respective outer side edges 44, 46 of the fender body. In addition, the illustrated second section 60 optionally has a generally trapezoidal shape and has optional ear or projecting portions 64, 66 which extend outwardly beyond the outer side edges 44, 46 of the quarter fender. As a result, additional spray deflection is provided in comparison to a structure without such ears.

In a form where section 60 is of a polymer material, or of some other resilient material, this section will tend to flex relative to the quarter fender body 22 when engaged, for example, if a trailer overhanging the quarter fender moves into engagement with section 60. Upon disengagement, section 60 will, due to its resilience, tend to return to its original position. This flexing motion of section 60 is facilitated by attaching section 60 to a narrowed neck 62. In addition, the average thickness of neck 62 is typically greater than the average thickness of section 60, at least along a transversely extending region of the section 60. Consequently, the intersection of sections 60 and 62 in effect constitutes a transversely extending hinge line which, in the illustrated form, traverses the entire width of the section 60.

FIG. 6 illustrates the relative thicknesses of sections 60 and 62 in greater detail. As a specific example, the section 60 may have a region 80 of a reduced average thickness, with 3.00 millimeters being a specific example. Region 80 may be bounded by a rib 82 along its side and upper edges for rigidity purposes. In contrast, the average thickness of neck 62 may be the same as the average thickness of remaining portions of the quarter fender, with 6.4 millimeters being a specific example. With this construction, in the event section 60 becomes damaged, the section 60 may be severed, for example, at a location 84, immediately above the neck 62. For example, if quarter fender 10 is of polymer, a knife may be used to cut section 60 away from neck 62. As can be seen in FIGS. 1 and 2, this severing region or line 84 extends transversely across the entire neck in this specifically illustrated embodiment. Rather than making the entire section 60 of a reduced average thickness, another exemplary approach is to reduce this thickness of section 60 solely along the severing region 84.

Once the removable section 60 is detached from the quarter fender 10, a replacement deflector flap section 100 may be installed. For example, replacement flap section 100 may be mounted by a plurality of spaced apart fasteners, one being indicated at 102 in FIG. 7, to the neck 62. To facilitate this replacement, a plurality of spaced apart recesses or partial penetrations 104 (FIGS. 3 and 6) may be provided at the back side of the neck 62. These recesses 104 may be drilled or otherwise penetrated to receive the fasteners 102 during installation of the replacement flap section 100. As can be seen in FIG. 2, recesses 104 in this construction are not visible from the front of the quarter fender assembly, and thus do not interfere with the aesthetics or aerodynamics of the front surface of the quarter fender. However, recesses 104 may constitute preformed openings extending completely through the neck. By including these recesses, precise positioning of fasteners 102 can easily be accomplished, as the recesses conveniently may be located at locations which match preformed mounting holes in the replacement deflector flap.

Referring to FIGS. 1, 2, and 3, although mount 28 may take other forms, in the illustrated embodiment mount 28 is illustrated as a mount receiving receptacle 120 which extends transversely in a direction perpendicular to the longitudinal axis of the fender body 22 from one side edge 44 of the fender body toward the other side edge 46. An extension portion 124 of the receptacle 120 extends outwardly beyond outer side edge 44. The projection 14 from side rail 12 of the vehicle extends into the receptacle 120. A gap 130 extends longitudinally along the receptacle from the outer edge 132 of the receptacle and terminates at about the location of edge 44 of the fender body. The receptacle 120 typically has a cross sectional dimension which is slightly larger than the cross sectional dimension of the projection 14, thereby facilitating insertion of the projection 14 into the receptacle. A clamping collar 132, shown in FIG. 1, may be tightened to close the gap 130 to cause the receptacle to grip the projection 14 and to securely mount the quarter fender 10 to the vehicle chassis.

The receptacle 120 maintains its full internal cross sectional dimension until approximately location 140 (FIG. 3), from which point on it tapers to its ending location at about location 142. Thus, in the illustrated embodiment, the receptacle 124 extends more than half of the way across the fender body from outer side edge 44 toward outer side edge 46. As can be seen in FIGS. 1 and 2, a recess 150 may be provided in the outer surface 52 of the fender body 22. The recess in the illustrated form is positioned to commence at the end of the receptacle 124 and to extend to the outer side edge 46. This recess provides clearance for access by an operator of the vehicle to components of the vehicle (not shown) positioned in the region of the quarter fender. For example, a removable side fairing may be provided with the recess providing access to a handle used for removing the side fairing. An example of this structure is found in commercially available Freightliner Century Class® trucks, from Freightliner Corporation.

Although variable, the nominal thickness of receptacle 124 may be about 12.25 millimeters. For reinforcing purposes, a plurality of ribs 154, 156, and 158 (see FIG. 4) extend lengthwise along the receptacle from outer edge 44 toward the location 142. Additional reinforcing ribs, which may be in the form of intersecting rib sections, extend between longitudinal ribs 144, 156, and 158. These cross ribs are indicated at 160, 162, 164, and 166 and interconnect the longitudinally extending ribs 154, 156, and 158, as shown. In the illustrated form, the cross ribs take on a repeating X-shaped pattern. The under surface 54 of fender body 22 may also be provided with reinforcing ribs. In the illustrated form, a plurality of M-shaped reinforcing ribs 170, 172, and 174 are positioned above one another (rib 170 being above rib 172, and rib 172 being above rib 174) and extend transversely generally from side edge 44 to side edge 46 of the fender body. Longitudinally extending reinforcing ribs 180, 182, 184, and 186 are also provided for rigidifying purposes. The reinforcing ribs increase the overall durability and strength of the quarter fender 10. Other rib patterns may also be used. In addition, reinforcing ribs may be eliminated, although this would detract from the durability of the construction. Alternatively, the durability may be increased with or without ribs by increasing the thickness of components of the quarter fender assembly. The entire quarter fender assembly, including the ribs, may be simultaneously molded of a homogenous polymer material, without requiring any inserts. FIGS. 4 and 5 also illustrate the reinforcing rib construction of this illustrated embodiment.

The alternative embodiment of FIGS. 8 and 9 is identical in many respects to the embodiment of FIGS. 1–7. Consequently, similar components from the FIGS. 1–7 form of quarter fender have been assigned the same numbers in FIGS. 8 and 9.

As can be seen in FIGS. 8 and 9, in this illustrated construction, the central portion 50 of the fender body 22 is of a reduced width commencing at a location below the location of the mount 28. In particular, a transition region 190 is provided in side edge 44. The illustrated transition region is generally S-shaped. The portion of side edge 44 of the quarter fender 10 above the transition region is indicated at 192, while the portion below the transition region is indicated at 194. The quarter fender 10 is wider at location 192 than at location 194, below the transition region. Thus, in this alternative embodiment, outer side edge 44 converges toward the side edge 46 at the transition region.

This narrowed width of the quarter fender 10 provides a clearance space for suspension components (not shown) such as found in some commercially available Freightliner Century Class® trucks.

Referring again to FIGS. 1–3, the mount 28, in this case the receptacle 120, projects outwardly from the under surface 54 of the quarter fender assembly and does not project to any significant extent (and, in the illustrated embodiment is flush with) the upper surface 52 of fender body 22. Consequently, the mount 28, where it underlays the central fender portion 50, does not interfere with the aerodynamics or aesthetics of the upper surface 52 of the central fender portion. That is, a projection free surface is provided across the central fender portion 50 from lower edge 42 to upper edge 40. The illustrated form of recess 150 also lacks projections into locations above the elevation of the top surface 52 of central portion 50.

Having illustrated and described the principles of my invention with references to several preferred embodiments, it should be apparent to those of ordinary skill in the art that these embodiments may be modified in arrangement and detail without departing from the principles of my invention.

I claim all novel and non-obvious modifications of these embodiments which fall within the scope of the following claims.

I claim:

1. A quarter fender for mounting to a quarter fender mount on a vehicle, the quarter fender comprising:
   a one-piece integral body having a fender portion, a deflector flap portion, and a mounting portion;
   the fender portion having an upper edge portion, a lower edge portion, first and second outer side portions, and a central fender portion with a top surface and an under surface;
   the deflector flap portion extending from the upper edge portion of said fender portion; and
   the mounting portion being adapted for mounting to the quarter fender mount to mount the quarter fender to the vehicle.

2. The quarter fender of claim 1 wherein the deflector flap portion has a removable section which is adapted for severing for detachment of the removable section from the remaining portions of the quarter fender.

3. The quarter fender of claim 2 wherein said deflector flap portion is adapted to receive a replacement flap portion upon detachment by severing of the removable section.

4. A quarter fender for mounting to a quarter fender mount on a vehicle, the quarter fender comprising:
   a body having a fender portion, a deflector flap portion, and a mounting portion;
   the fender portion having an upper edge portion, a lower edge portion, first and second outer side portions, and a central fender portion with a top surface and an under surface;
   the deflector flap portion extending from the upper edge portion of said fender portion;
   the mounting portion being adapted for mounting to the quarter fender mount to mount the quarter fender to the vehicle;
   wherein the deflector flap portion has a removable section which is adapted for detachment;
   wherein said deflector flap portion includes a first section having a first average thickness positioned adjacent to the upper edge portion of the fender portion, the removable section being coupled to the upper edge portion by the first section, the removable section having a severing region having a second thickness which is on average less than the first average thickness, whereby the removable section may be severed from the first section in the event the removable section becomes damaged with the first section remaining for attachment of a replacement second section to the first section.

5. The quarter fender of claim 4 wherein the first section includes spaced apart partial penetrations for respectively receiving replacement flap mounting fasteners for coupling a replacement second section to the first section.

6. A quarter fender for mounting to a quarter fender mount on a vehicle, the quarter fender comprising:
   a one-piece body having a fender portion, a deflector flap portion, and a mounting portion;
   the fender portion having an upper edge portion, a lower edge portion, first and second outer side portions, and a central fender portion with a top surface and an under surface;
   the deflector flap portion extending from the upper edge portion of said fender portion; and
   the mounting portion being adapted for mounting to the quarter fender mount to mount the quarter fender to the vehicle,
   wherein the quarter fender mount comprises a projecting mount and wherein the mounting portion comprises a mounting projection receiving receptacle formed integrally with the body and being adapted to receive the projecting mount to mount the quarter fender to the vehicle, the mounting portion projecting outwardly from the under surface of the fender portion and away from the top surface of the fender portion, the top surface of the fender portion being a substantially continuous smooth surface between said upper and lower edge portions.

7. The quarter fender of claim 1 wherein the mounting portion is positioned along the upper edge portion of said fender portion.

8. The quarter fender of claim 1 wherein the mounting portion extends from the first outer side portion toward the second outer side portion and wherein the central portion narrows from a position below the mounting portion and toward the lower edge portion.

9. A quarter fender for a vehicle including:
   a fender body having an upper edge portion, a lower edge portion, a width, first and second outer side portions, a center portion with a top surface, and an under surface;
   a deflector flap extending from the upper edge portion of said fender body; and
   a mounting receptacle coupled to the center portion and configured and positioned such that the top surface is substantially smooth where the top surface overlies the mounting receptacle.

10. The quarter fender of claim 9 wherein the mounting receptacle is positioned adjacent to the upper edge portion of said fender body.

11. The quarter fender of claim 10 wherein the mounting receptacle extends more than one-half the width of the fender body from the first outer side portion toward the second outer side portion; and wherein the center portion includes a recess extending into the top surface of the fender body, the recess extending at least partially across the fender body from the mounting receptacle toward the second outer side portion.

12. The quarter fender of claim 11 wherein said fender body, flap, and mounting receptacle are portions of a homogeneous one-piece quarter fender.

13. The quarter fender of claim 12 wherein the quarter fender is of a polymer material.

14. The quarter fender of claim 13 wherein the deflector flap includes a first portion having a first average thickness extending from the upper edge portion and a second portion extending upwardly from the first portion and being separated from the first portion by a deflector flap severing region, the severing region on average having a second thickness which is less than the first average thickness, whereby the second portion is detachable from the first portion by severing the deflector flap severing region.

15. The quarter fender of claim 14 wherein said first portion is adapted to receive a replacement flap.

16. The quarter fender of claim 14 including a replacement flap, wherein said deflector flap first portion has a plurality of spaced apart fastener receiving recesses extending partially therethrough, whereby the recesses may be penetrated to receive fasteners for attaching the replacement flap to the first portion.

17. A quarter fender for mounting to a quarter fender mount on a vehicle, the quarter fender comprising:

a body having a fender portion, a deflector flap portion, and a mounting portion;

the fender portion having an upper edge portion, a lower edge portion, first and second outer side portions, and a central fender portion with a top surface and an under surface;

the deflector flap portion extending upwardly from the upper edge portion of said fender portion when the quarter fender is installed on a vehicle, the deflector flap portion including a neck projecting upwardly from the upper edge portion, the deflector flap portion including a generally trapezoidal-shaped deflector flap section extending upwardly from the neck portion.

18. A quarter fender according to claim 17 in which the deflector flap section has an average thickness which is less than the average thickness of the neck, thereby facilitating deflection of the second section of the deflector flap portion and also the severing of the second section from the neck.

19. A quarter fender for mounting to a vehicle to deflect spray and the like from a tire adjacent to the quarter fender, the quarter fender comprising:

a one-piece body of a polymer material having upper and lower end portions, first and second outer side edge portions, and a central body portion having a top surface and an under surface, the under surface being positioned adjacent to the wheel of the vehicle when the quarter fender is mounted to the vehicle;

the upper end portion of the body comprising a deflector flap projecting upwardly from an upper region of the central body portion, the deflector flap having a first section of a first average thickness and a second section having a severing region of a second average thickness which is less than the first average thickness, the second section being coupled to the central body portion by the first section, the first section having spaced apart fastener receiving recesses, whereby upon damage to the second section of the deflector flap, the second section may be severed from the first section at the severing region and a replacement second section may be installed by coupling the replacement second section to the first section with fasteners extending through the replacement second section and openings formed through the spaced apart fastener receiving recesses; and the body also including a mounting projection receiving receptacle extending from one of the first and second side edge portions and more than one-half of the distance across the central body portion toward the other of the first and second side edge portions, the mounting projection receiving receptacle projecting outwardly from the under surface of the central body and not projecting outwardly from the top surface of the central body portion.

20. A quarter fender according to claim 19 including a recess in the top surface of the central body portion which is positioned between the mounting projection receiving receptacle and the other of the first and second outer side edge portions.

* * * * *